(12) United States Patent
Dong et al.

(10) Patent No.: US 7,845,170 B2
(45) Date of Patent: Dec. 7, 2010

(54) DRIVE WHEEL WITH AN INTEGRAL FAN FOR A HYDRAULIC POWER UNIT

(75) Inventors: Xingen Dong, Farmington, CT (US); Barun Acharya, Johnson City, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 641 days.

(21) Appl. No.: 11/761,687

(22) Filed: Jun. 12, 2007

(65) Prior Publication Data

US 2008/0307782 A1 Dec. 18, 2008

(51) Int. Cl.
*F16D 31/02* (2006.01)
(52) U.S. Cl. .................................................. 60/456
(58) Field of Classification Search .............. 60/456, 60/487; 416/185, 186 R, 247 R
See application file for complete search history.

(56) References Cited

U.S. PATENT DOCUMENTS

| 1,998,087 | A | * | 4/1935 | Koch, Jr. ..................... 310/62 |
| 5,093,591 | A | | 3/1992 | Kitamura et al. |
| 5,259,726 | A | * | 11/1993 | Bacria ..................... 416/247 R |
| 5,304,040 | A | * | 4/1994 | Wang ..................... 416/247 R |
| 6,973,783 | B1 | * | 12/2005 | Hauser et al. ................. 60/487 |

* cited by examiner

*Primary Examiner*—Michael Leslie
(74) *Attorney, Agent, or Firm*—Renner, Otto, Boisselle & Sklar, LLP

(57) ABSTRACT

A drive wheel with an integral fan mountable as a unit to a shaft of a hydraulic power unit for rotation therewith. Fan blades extending from the drive wheel circulate air when the drive wheel is rotated. One or more passageways extending through the drive wheel can be provided to allow air to flow axially therethrough to be circulated around the hydraulic unit. A fan assembly for a hydraulic power unit is also provided including a fan element and a rotatable shroud attached thereto.

6 Claims, 10 Drawing Sheets

DRIVE WHEEL WITH AN INTEGRAL FAN FOR A HYDRAULIC POWER UNIT

FIELD OF THE INVENTION

The present invention relates generally to hydraulic power units. More particularly, the invention relates to a drive wheel for a hydrostatic transmission.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

Hydrostatic transmissions generate heat as the hydraulic fluid is circulated between the pump and the motor. Friction between moving parts of the pump and/or motor also generates heat. As hydrostatic transmissions become more compact, heat related issues become more of a problem due to the decreased surface area of the hydrostatic transmission available for dissipating heat.

SUMMARY OF THE INVENTION

The present invention provides a drive wheel with an integral fan mountable as a unit to a shaft of a hydraulic unit for rotation therewith. Fan blades extending from the drive wheel circulate air when the drive wheel is rotated. One or more passageways extending through the drive wheel can be provided to allow air to flow axially therethrough to be circulated around the hydraulic unit. A fan assembly for a hydraulic power unit is also provided including a fan element and a rotatable shroud attached thereto.

Accordingly, a drive wheel for a hydraulic power unit comprises an outer rim portion configured to mate with an endless drive element, a hub portion securable to a shaft for rotation therewith about an axis of rotation of the shaft, and a web portion connecting the outer rim portion and the hub portion. The web portion has at least one portion thereof forming a fan blade for circulating air when the drive wheel is rotated. The web portion can include at least one spoke portion extending from the hub and having an inclined portion thereof being the fan blade. Alternatively, the web portion can include at least one spoke portion extending from the hub, and an inclined portion extending from the spoke portion being the fan blade.

In an exemplary embodiment, the drive wheel includes passageways through the web portion through which air can pass when circulated by the at least one fan blade. The passageways can be openings formed by portions of the web portion that form the fan blades. The web portion is generally cup-shape for guiding air circulated by the at least one fan blade, and for axially offsetting the hub from the outer rim portion.

According to another aspect of the invention, a hydraulic power unit comprises a housing, a rotatably driven shaft extending from the housing, the shaft connected to a rotating element of the hydraulic power unit, and a drive wheel fixed to the rotatably driven shaft for rotation therewith. The drive wheel has an outer rim portion configured to mate with an endless drive element, a hub portion, and a web portion connecting the outer rim portion and the hub portion. The web portion has at least one portion thereof forming a fan blade for circulating air when the drive wheel is rotated.

In an exemplary embodiment, the drive wheel has passageways through which air can pass. The web portion of the drive wheel is cup-shape for guiding air circulated by the at least one fan blade, and for axially offsetting the hub from the outer rim portion. The web portion cooperates with a correspondingly shaped portion of the housing of the transmission to guide the air around the housing.

According to another aspect of the invention, a hydraulic power unit comprises a housing, a rotatably driven shaft extending from the housing, the shaft connected to a rotating element of the hydraulic power unit, and a fan assembly mounted to the shaft for rotating therewith. The fan assembly includes a rotatable fan member and a fan shroud attached to the fan member for rotation therewith.

In an exemplary embodiment, the rotatable fan member is an axial flow fan and the fan shroud includes a plurality of radially extending slots arranged in a spiral configuration for permitting air to flow through the shroud when circulated by the fan member. The fan member includes a hub portion, a plurality of fan blades extending from the hub portion, and an outer ring surrounding the fan blades. The fan shroud includes at least one retainer for securing the fan shroud to at least one slot in the fan member.

Further features of the invention will become apparent from the following detailed description when considered in conjunction with the drawings.

DETAILED DESCRIPTION

Figure 1:
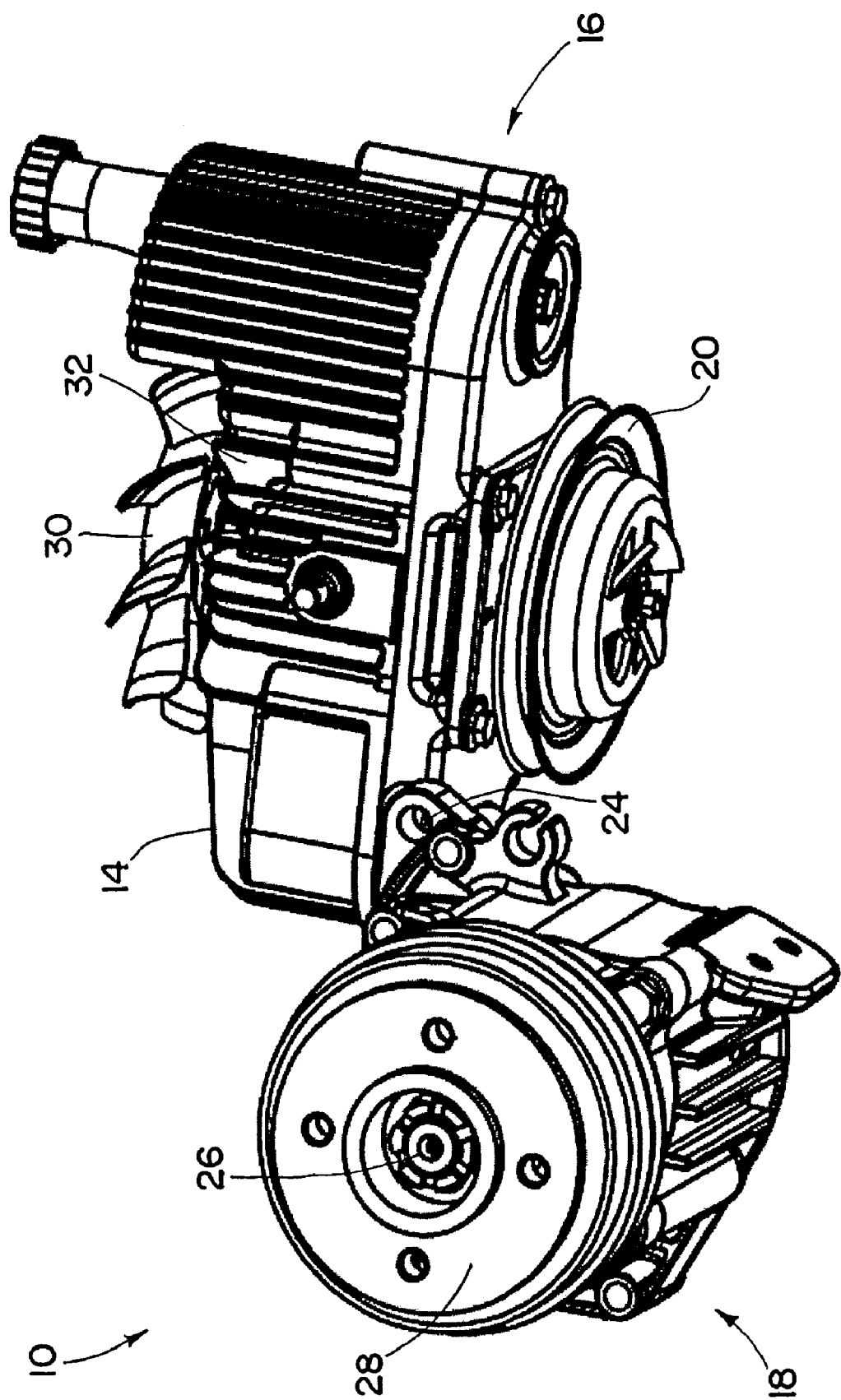
FIG. 1 is a perspective view of a side of a hydrostatic transmission including a drive wheel with an integral fan in accordance with the invention.
Figure 2:
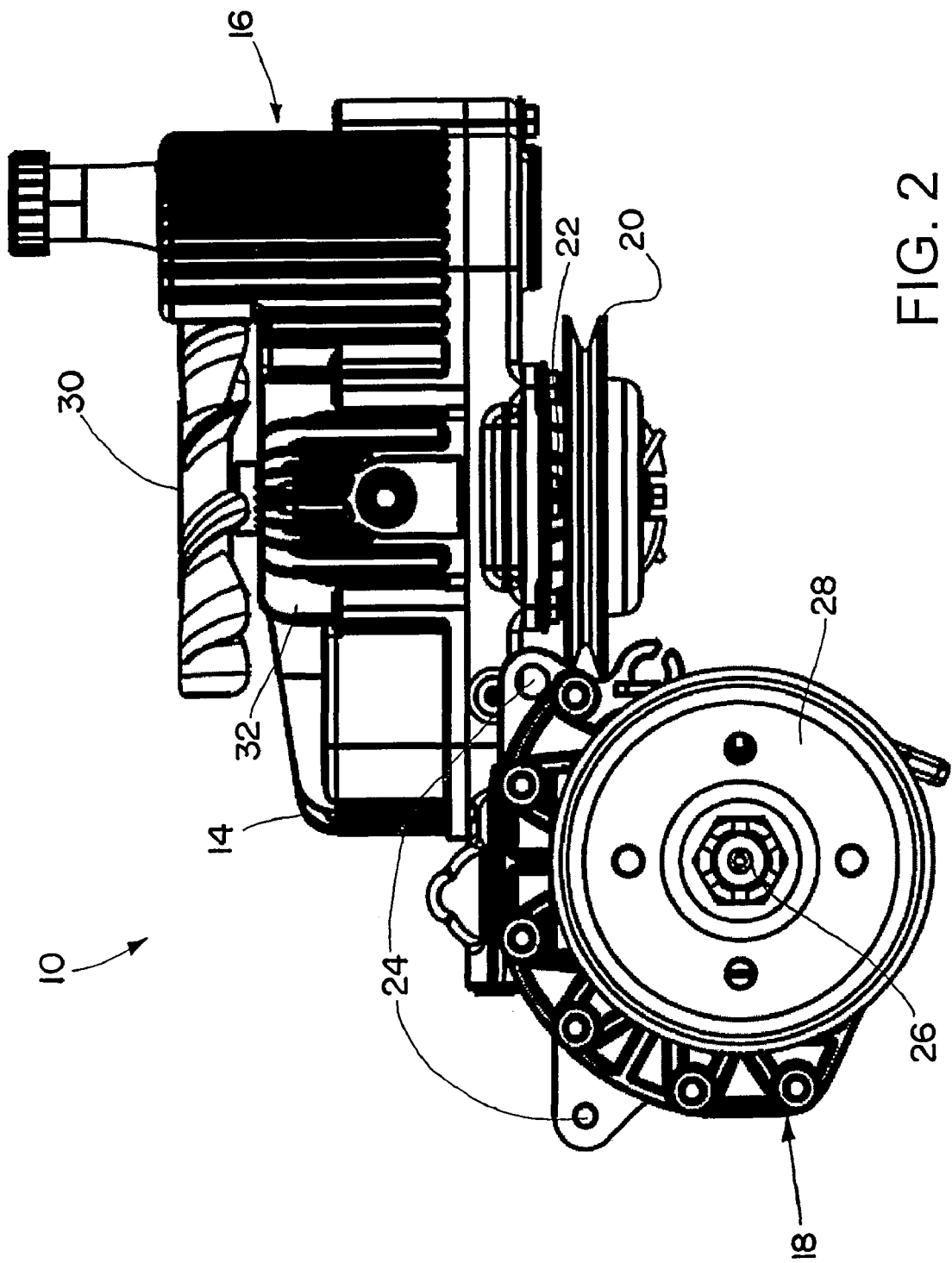
FIG. 2 is a side elevational view of the hydrostatic transmission of FIG. 1.

Referring now to the drawings in detail, and initially to FIGS. 1 and 2, an integrated hydrostatic transmission 10 (IHT) includes a housing 14 having a pump portion 16 a motor portion 18 and a drive wheel with an integral fan 20 mounted to an input shaft 22 of a pump element (not shown) supported in the pump portion 16 of the housing 14. The hydrostatic transmission 10 is mountable to a frame of a vehicle, such as a mower, as a unit. In this regard, mounting holes 24 are provided on the motor portion 18 of the housing 14 for securing the hydrostatic transmission 10 to a frame member (not shown) of a vehicle. The motor portion 18 of the housing 14 contains a motor element having an output shaft 26 to which a wheel hub 28 is secured for rotation therewith. It will be appreciated that a drive wheel of a vehicle can be mounted to the wheel hub 24 for propelling the vehicle over a surface in a conventional manner.

The motor element and the pump element of the hydrostatic transmission 10 are connected via suitable supply and return lines within the housing 14 in a closed hydraulic loop. Accordingly, rotation of the input shaft 22 causes the pump element to pump fluid to the motor element via the closed loop thereby effecting rotation of the output shaft 26 of the motor element and, consequently, the wheel hub 28 mounted thereto.

As mentioned, the drive wheel with integral fan 20 is secured to the input shaft 22 of the pump element. A separate fan element 30 is also attached to the input shaft 22 for circulating air around the pump portion 16 of the housing 14 for dissipating heat generated by the hydrostatic transmission 10. In this regard a plurality of cooling fins 32 are provided on an exterior surface of the pump portion 16 of the housing 14.

Figure 3:
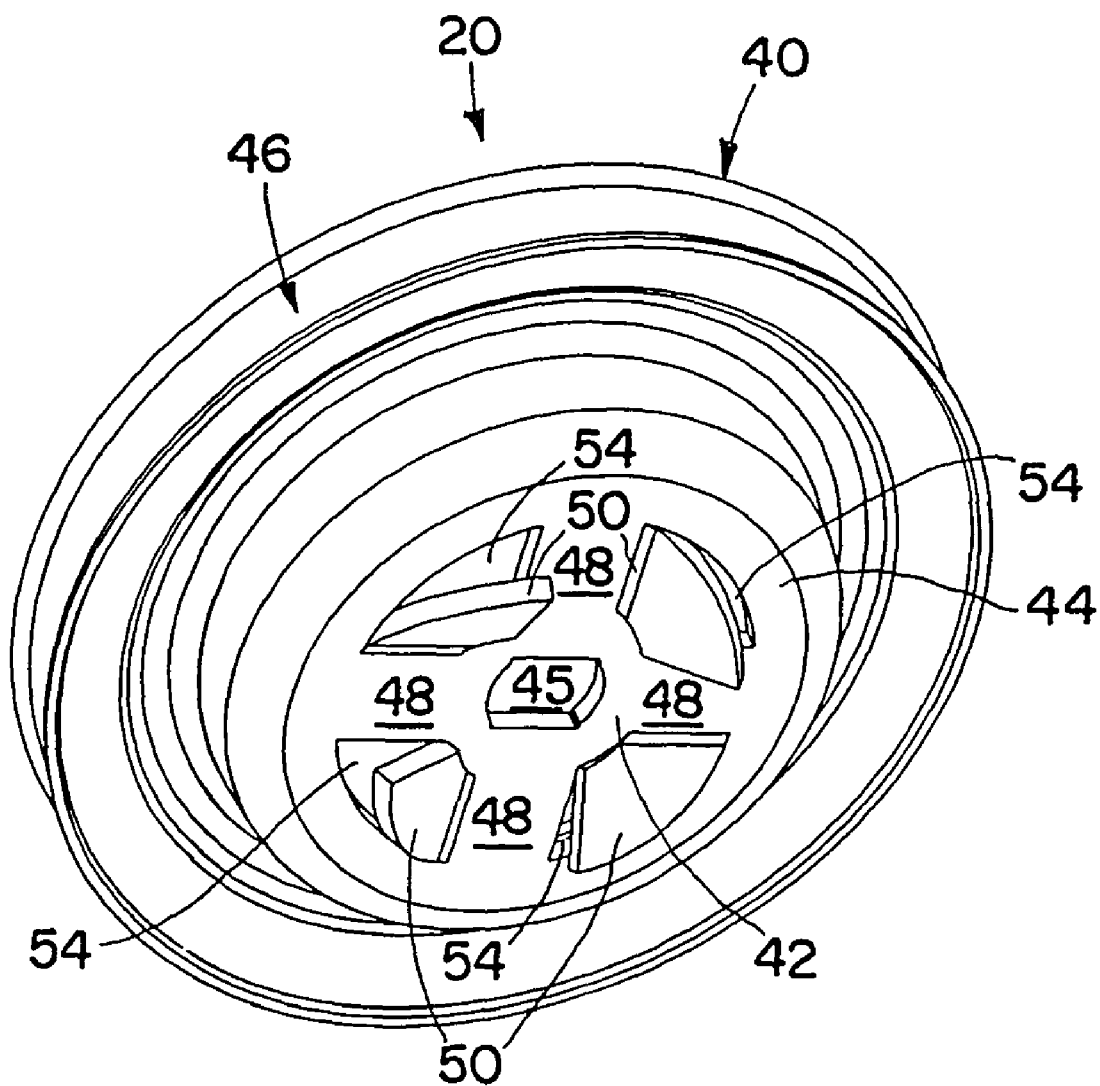
FIG. 3 is an enlarged perspective view of the drive wheel with an integral fan of FIGS. 1 and 2.
Figure 4:
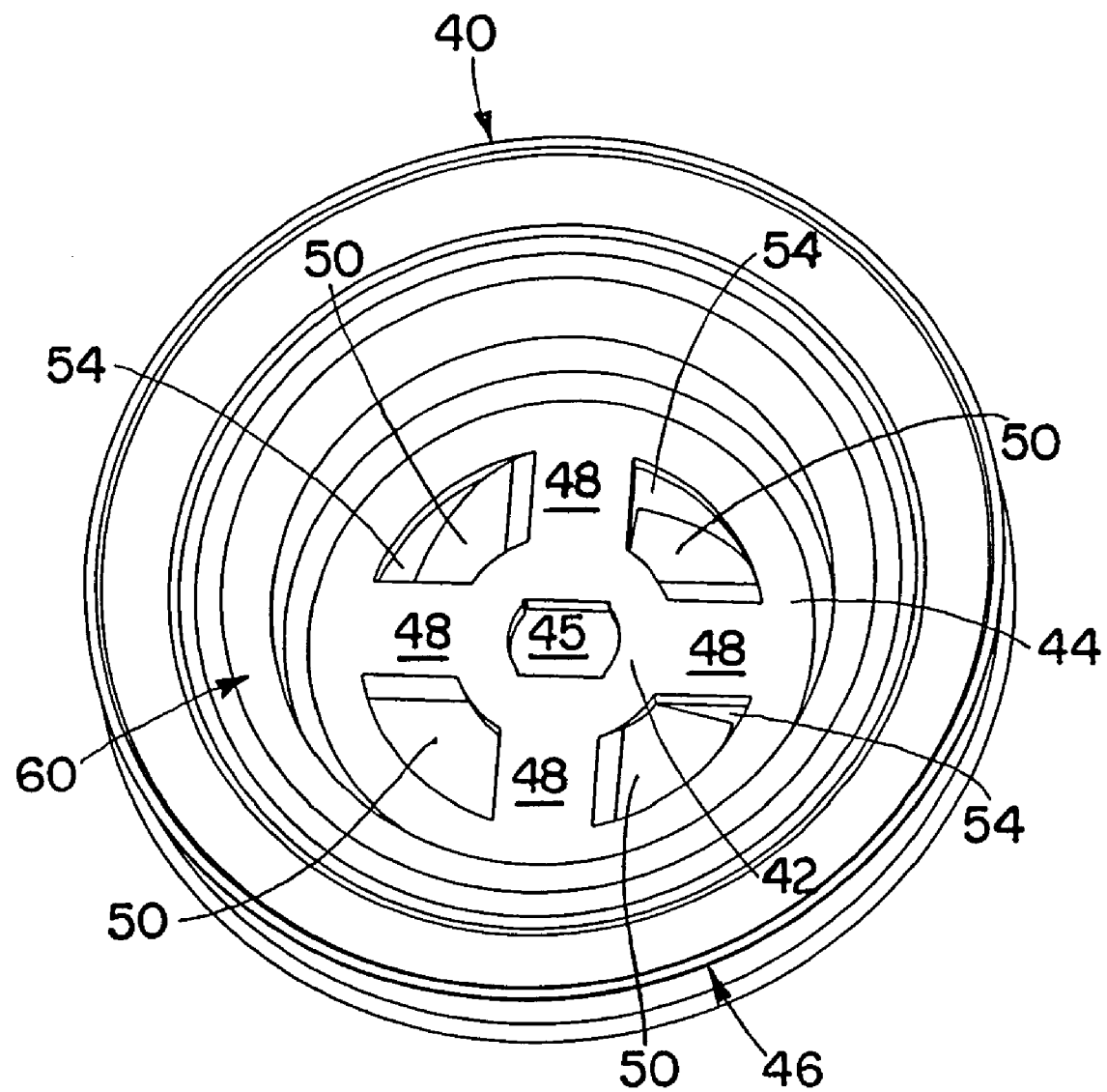
FIG. 4 is another enlarged perspective view of the drive wheel with integral fan of FIGS. 1 and 2.

Turning now to FIGS. 3 and 4, the details of the drive wheel with integral fan 20 will be described. The drive wheel 20 includes an outer rim portion 40, a hub 42, and web portion 44 connecting the outer rim portion 40 and the hub portion 42. The hub portion 42 includes a non-circular center hole 45 for mounting the drive wheel 20 to a corresponding non-circular portion of the input shaft 22. The outer circumferential portion 40 has a groove 46 for receiving an endless drive element, such as a belt, for transmitting the rotational output of a prime mover, such as an internal combustion engine, to the IHT 10.

The web portion 44 of the drive wheel body 20 has four spoke portions 48 extending from the hub portion 42. Four fan blades 50 for circulating air when the drive wheel 20 is rotated extend from respective adjacent spoke portions 48. The fan blades 50 are inclined relative to a central plane common to the spoke portions 48 of the web portion 44. In the illustrated embodiment, the fan blades 50 are formed as a unitary structure with the web portion 44, and are sections of the web portion 44 that are displaced, or otherwise bent, from the central plane of the spoke portions 48. It will be appreciated that the fan blades 50 can be made by any suitable process, such as a stamping process. Other processes of forming the fan blades are also possible, such as casting or molding.

The illustrated fan blades 50 are separated and spaced apart from the surrounding material of the web portion 44 along three edges, thereby forming passageways 54 through the web portion 44. The passageways 54 provide a path for air to flow axially from one side of the drive wheel 20 to the other. Accordingly, as the drive wheel 20 rotates, the fan blades 50 circulate air axially through the passageways 54 and around the housing 14 of the IHT 10.

To further enhance and/or guide the flow of air circulated by the fan blades 50 around the housing 14, the web portion 44 of the drive wheel 20 has a general cup-shape configuration. The cup-shape of the web portion 44 defines a cavity 60 (e.g. recess) on the side of the drive wheel 20 adjacent the housing 14 of the IHT 10. The cavity 60 cooperates (e.g. nests) with a correspondingly shaped portion of the housing 14 to guide the air circulated by the fan blades 50 radially outward and around the housing 14. The cup-shape web portion 44 also facilitates a more compact IHT design by allowing the drive wheel 20 to partially surround the housing 14.

Figure 5:
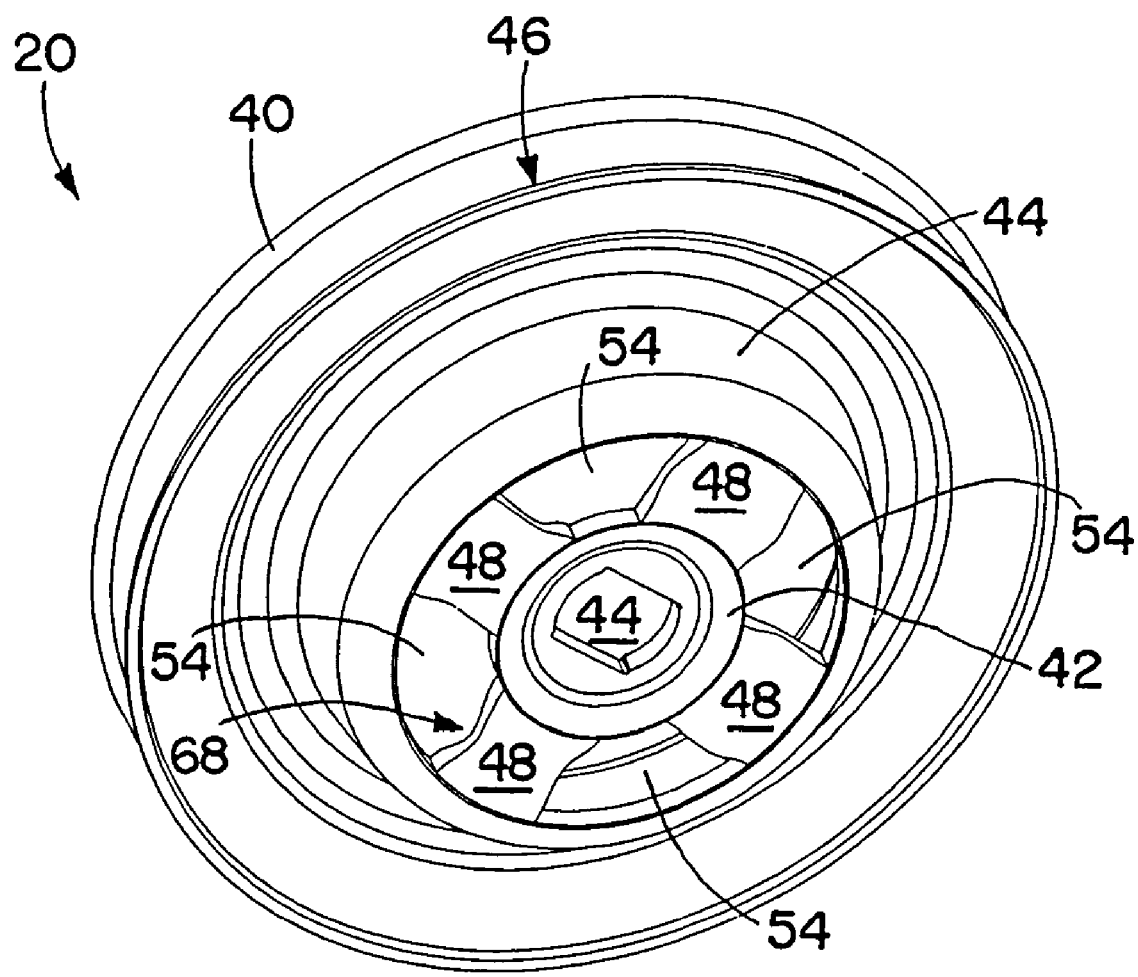
FIG. 5 is a perspective view of another drive wheel with integral fan in accordance with the invention.
Figure 6:
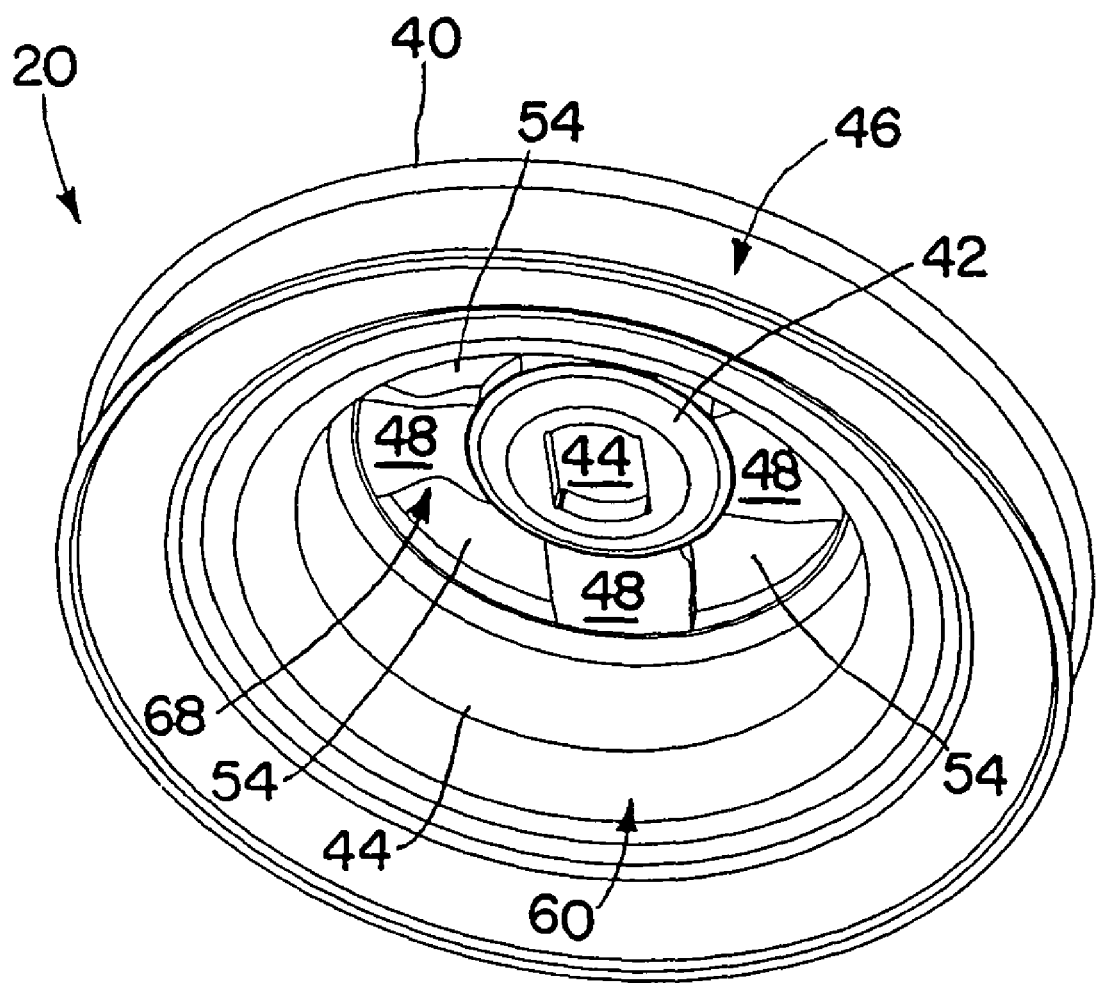
FIG. 6 is another perspective view of the drive wheel of FIG. 5.

Turning now to FIGS. 5 and 6, another embodiment of the drive wheel with integral fan 20 is illustrated. Similar to the embodiment of FIGS. 3 and 4, the drive wheel 20 includes an outer rim portion 40, a hub 42, and web portion 44 connecting to outer rim portion 40 and the hub portion 42. The hub portion 42 includes a non-circular center hole 44 for mounting the drive wheel 20 to a non-circular portion of a shaft, such as the input shaft 22 in FIGS. 1 and 2. The outer circumferential portion 40 has a groove 46 for receiving an endless drive element. The web portion 44 of the drive wheel 20 has four spoke portions 48 extending from the hub portion 42.

In this embodiment, the fan blade elements 50 are inclined sections 68 of the spoke portions 48. These inclined sections 68 are bent or otherwise displaced so as to have pitch such that rotation of the drive wheel 20 results in circulation of air by the fan blades 50. Passageways 54 in this embodiment are sections of the web portion 48 that have been removed, such as by a stamping process, for example.

Figure 7:
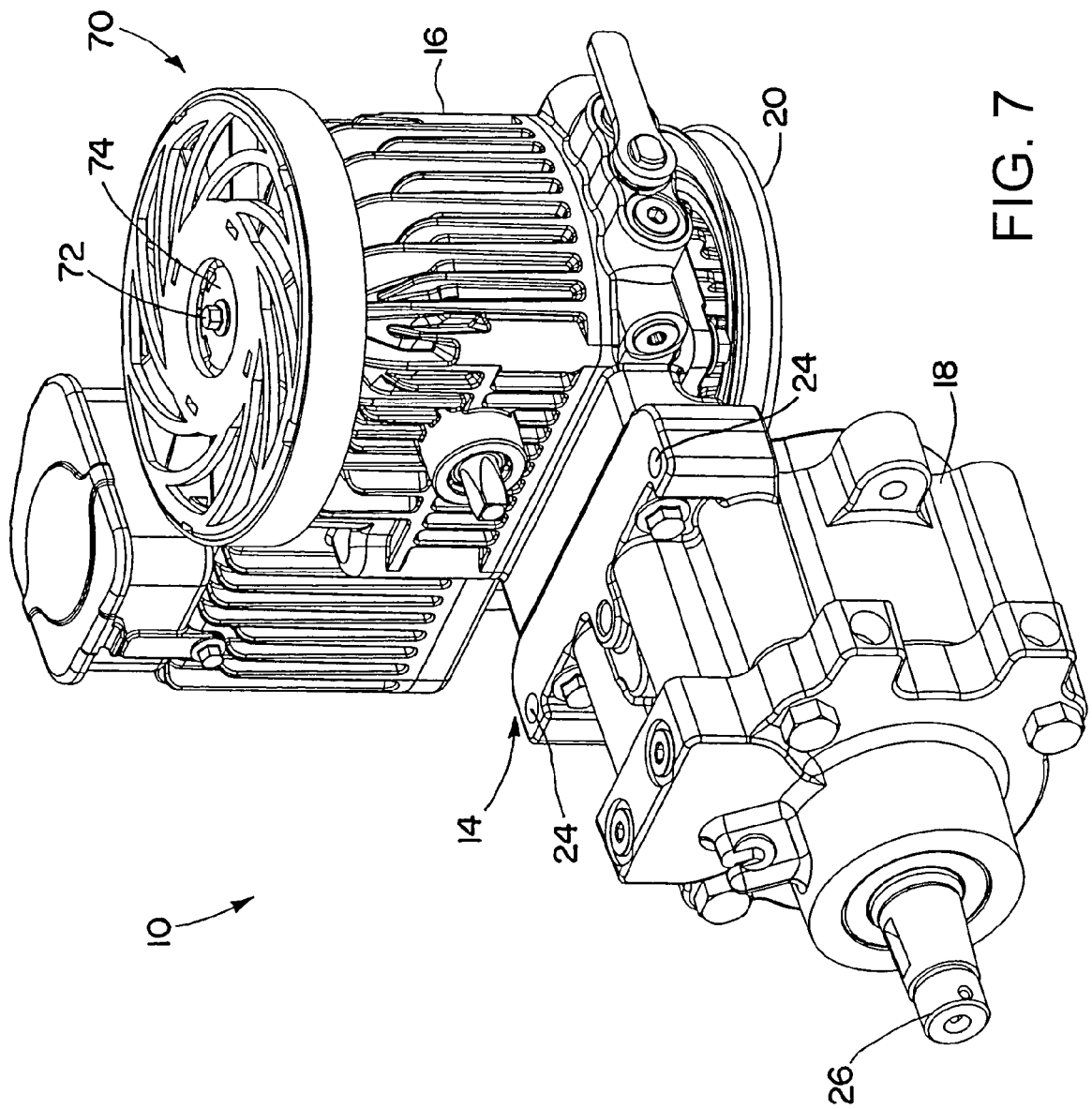
FIG. 7 is a perspective view of a side of a hydrostatic transmission including a fan assembly in accordance with the invention.

Turning to FIG. 7, another IHT 10 is illustrated. The IHT 10 is similar in most respects to the IHT shown and described in connection with FIGS. 1 and 2 and includes a housing 14 having a pump portion 16 and a motor portion 18. A drive wheel 20, which may be a drive wheel as described above, is mounted to an input shaft of a pump element (not shown) supported in the pump portion 16 of the housing 14. The pump element may be a piston pump, for example. The hydrostatic transmission 10 is mountable to a frame of a vehicle, such as a mower, as a unit and mounting holes 24 are provided on the motor portion 18 of the housing 14 for such purpose. The motor portion 18 of the housing 14 contains a motor element (e.g., a gerotor motor) having an output shaft 26 to which a wheel hub and drive wheel of a vehicle can be secured for rotation therewith.

The IHT 10 further includes a fan assembly 70 mounted to the input shaft of the pump element for rotation therewith by a bolt 72 and washer 74. The fan assembly 70 is configured to circulate air around the housing 14 when the input shaft is rotated. The fan assembly 70 is located on an opposite side of the housing from the drive wheel 20. Both the fan assembly 70 and the drive wheel 20 can be configured to circulate air in the same direction, for example from the top of the IHT 10 downward.

Figure 8:
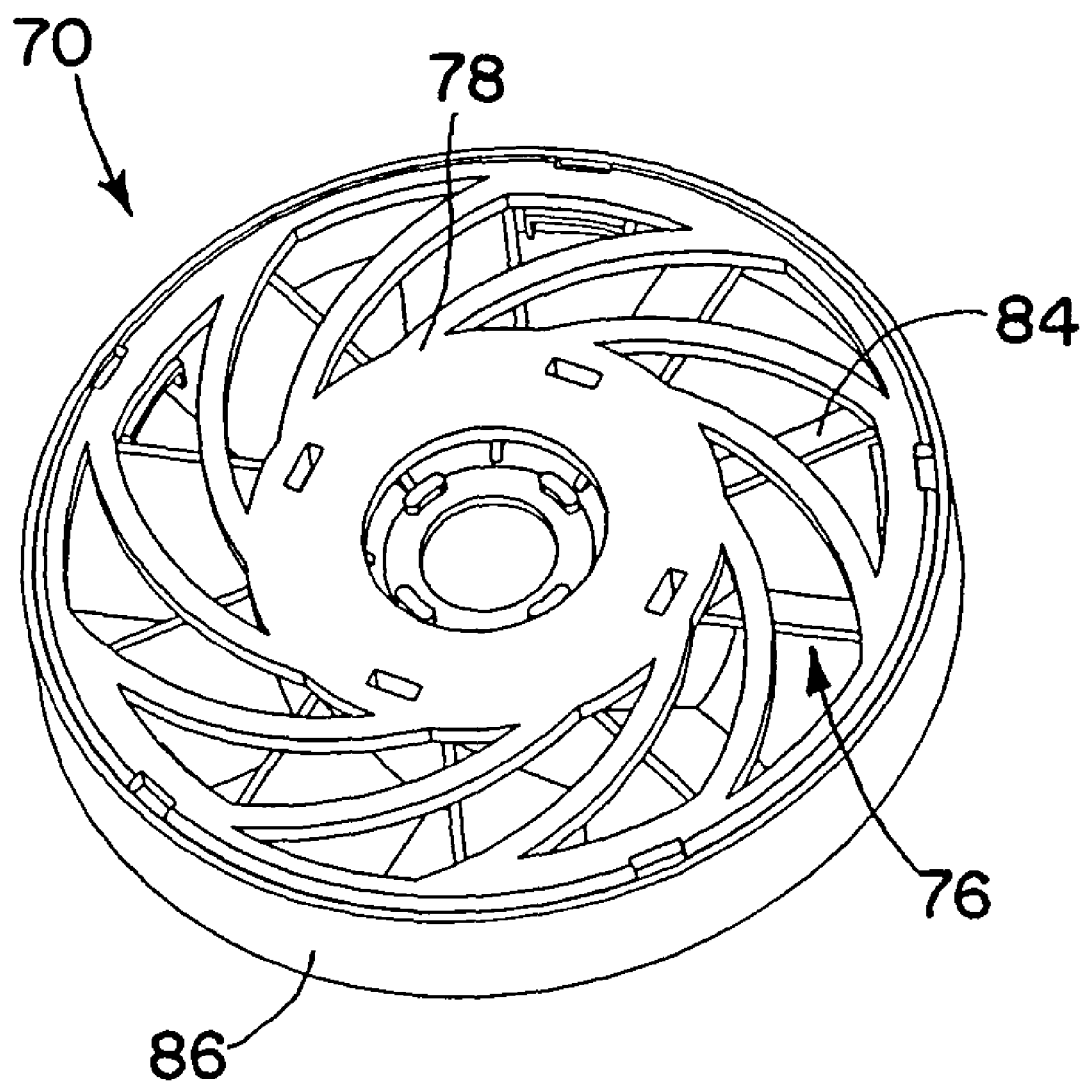
FIG. 8 is a perspective view of the fan assembly.
Figure 9:
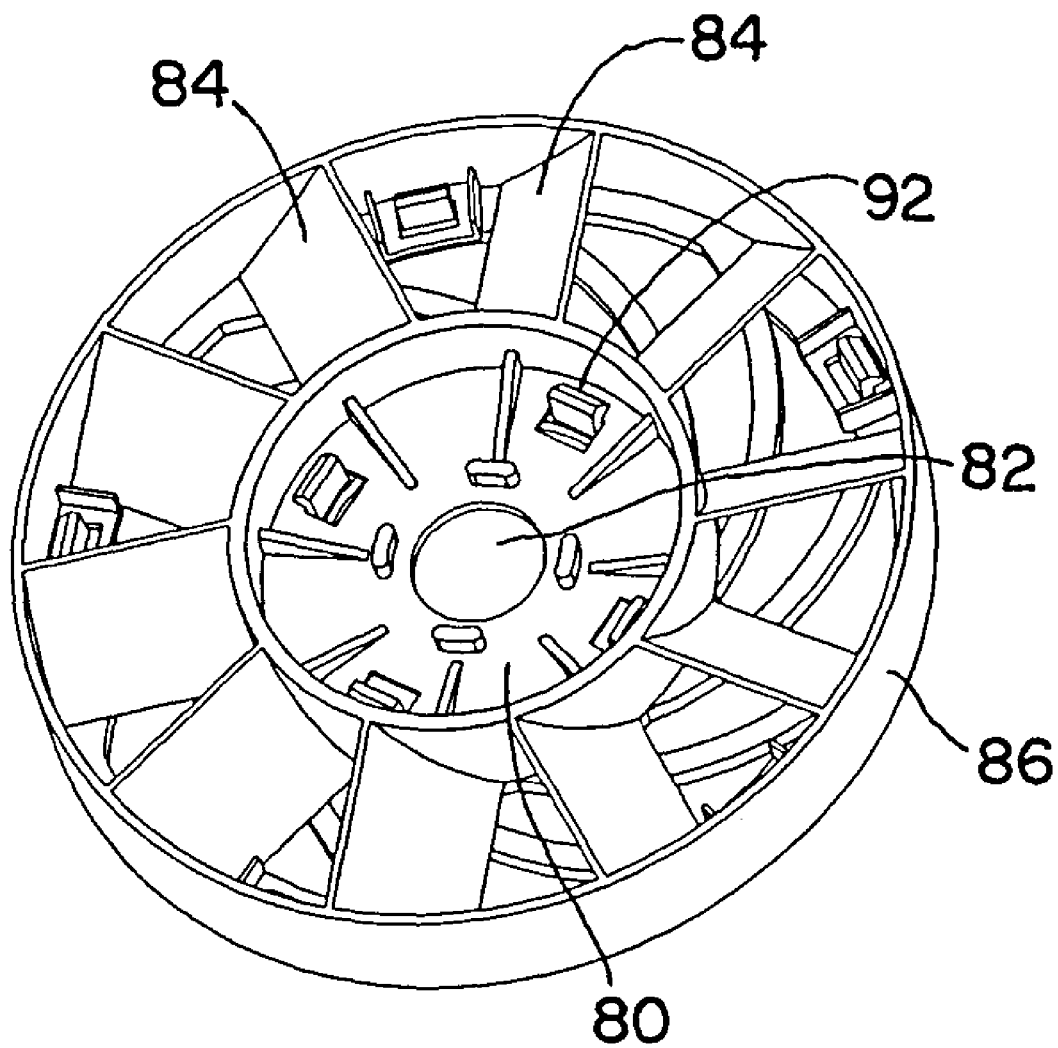
FIG. 9 is another perspective view of the fan assembly.
Figure 10:
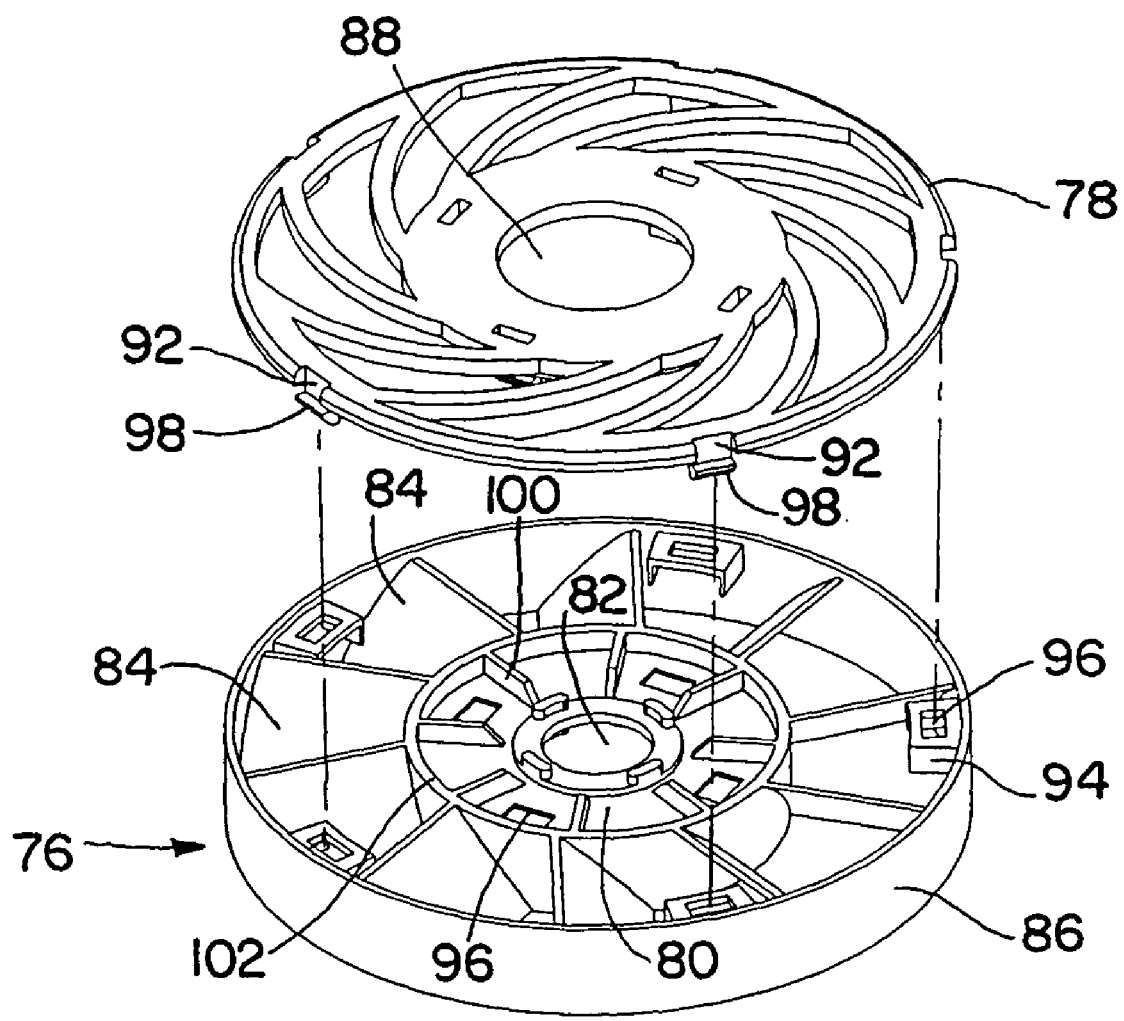
FIG. 10 is an assembly view of the fan assembly.

Turning to FIGS. 8-10, the details of the fan assembly 70 will be described. The fan assembly 70 includes a fan member 76 and a shroud member 78. The fan member 76 has a hub portion 80 with a hole 82 for receiving the input shaft of the IHT 10. The fan member 76 can be secured to the input shaft for rotation therewith in any suitable manner, such as with the bolt 72 and washer 74 (see FIG. 7). Fan blades 84 extend radially from the hub portion 80, and an outer ring 86 surrounds the radially outer edges of the fan blades 84.

The shroud member 78 is generally planar and has an annular center portion 87 having a center opening 88 to provide access to tighten the bolt 72 in order to secure the fan assembly 70 to the input shaft. Slots 90 (openings) are arranged about the center opening 88. The slots 90 allow air to pass through the shroud member 78 when circulated by the fan member 76. In the embodiment illustrated in FIGS. 7-10, the slots 90 are bounded by spiral-shape arms that extend from the annular center portion 87. The arms are configured to indicate a direction of rotation of the fan assembly 70. Thus, the illustrated fan assembly 70 will be rotated in a counter-clockwise direction and, as such, each spiral-shape RM 91 extends from the annular inner portion 87 in a clockwise direction with an increasing radius of curvature. The direction of rotation of the fan blade assembly 70 can be ascertained whether the assembly 70 is rotating or stationary. As will be appreciated, other slot shapes and configurations are also possible.

The shroud member 78 is secured to the fan member 76 by five snap retainers 92 spaced circumferentially around its outer circumference and configured to engage five shroud brackets 94 on the outer ring 86. Each shroud bracket has a slot 96 for receiving a snap retainer 92. Once a snap retainer 92 is received within the slot 96, a catch portion 98 of the snap retainer 92 engages an edge of the shroud bracket 94 surrounding the slot 96 thereby restricting removal of the snap retainer 92. Snap retainers 92 are also provided spaced around the opening 88 of the shroud member 78, and are configured to engage corresponding slots 90 in the hub portion 80 of the fan member 76 in a similar manner.

It will be appreciated that once the snap retainers 92 are inserted into the slots 96, ribs 100 and rim portion 102 support the annular center portion 87 of the shroud portion 78 such that the snap retainers 92 are maintained in slight tension thereby urging the catch portions 98 of each snap retainer 92 against a surrounding edge of the slot 96. In this regard, it will be appreciated that the shroud member 78 can have a slight flexibility so as to able to deflect slightly inwardly to facilitate insertion of the snap retainers 92 into the slots 96.

It will be appreciated that by providing a fan assembly 70 having a shroud member 78 attached thereto obviates the need for a separate fan shroud and/or related housing associated with the IHT 10. Although the invention has been shown and described in connection with an IHT, it will be appreciated that aspect of the invention apply to other types of hydraulic power units, such as pumps and motors, for example.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic power unit comprising:
   a housing;
   a rotatably driven shaft extending from the housing, the shaft connected to a rotating element of the hydraulic power unit; and
   a fan assembly mounted to the shaft for rotating therewith;
   wherein the fan assembly includes a rotatable fan member, and a fan shroud attached to the fan member for rotation therewith;
   wherein the fan member includes a hub portion, a plurality of fan blades extending from the hub portion, and an outer ring surrounding the outer circumference of the fan blades and attached to the fan member for rotation therewith.

2. A hydraulic power unit as set forth in claim 1, wherein the rotatable fan member is an axial flow fan.

3. A hydraulic power unit as set forth in claim 1, wherein the fan shroud includes a plurality of radially extending slots arranged in a spiral configuration, the slots permitting air to flow through the shroud when circulated by the fan member.

4. A hydraulic power unit as set forth in claim 1, wherein the fan shroud includes at least one retainer for securing the fan shroud to at least one slot in the fan member.

5. A hydraulic power unit as set forth in claim 1, wherein the hydraulic power unit is a hydrostatic transmission including a hydraulic pump and motor, and the rotatably driven shaft is an input shaft of the hydraulic pump.

6. A hydraulic power unit as set forth in claim 1, further comprising a fan located on an opposite side of the housing from the fan assembly, wherein the fan and fan assembly are configured to circulate air in the same direction.

* * * * *